United States Patent
Sakai et al.

(10) Patent No.: US 11,065,990 B2
(45) Date of Patent: Jul. 20, 2021

(54) VEHICLE BODY STRUCTURE

(71) Applicant: HONDA MOTOR CO., LTD., Tokyo (JP)

(72) Inventors: Kazuhiro Sakai, Wako (JP); Tadashi Sato, Wako (JP); Kanji Kaneko, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 146 days.

(21) Appl. No.: 16/576,123

(22) Filed: Sep. 19, 2019

(65) Prior Publication Data

US 2020/0101879 A1 Apr. 2, 2020

(30) Foreign Application Priority Data

Sep. 27, 2018 (JP) .............................. JP2018-182744

(51) Int. Cl.
| | | |
|---|---|---|
| *B60N 2/50* | (2006.01) | |
| *B62D 21/03* | (2006.01) | |
| *B62D 21/09* | (2006.01) | |
| *B62D 21/11* | (2006.01) | |
| *B60K 1/02* | (2006.01) | |
| *B60K 1/04* | (2019.01) | |
| *B60N 2/01* | (2006.01) | |
| *B60N 2/06* | (2006.01) | |

(52) U.S. Cl.
CPC ................ *B60N 2/502* (2013.01); *B60K 1/02* (2013.01); *B60K 1/04* (2013.01); *B60N 2/012* (2013.01); *B60N 2/06* (2013.01); *B62D 21/03* (2013.01); *B62D 21/09* (2013.01); *B62D 21/11* (2013.01); *B60K 2001/0438* (2013.01)

(58) Field of Classification Search
CPC .......... B60N 2/502; B60N 2/012; B60N 2/06; B60K 1/02; B60K 1/04; B60K 2001/0438; B62D 21/03; B62D 21/09; B62D 21/11
See application file for complete search history.

(56) References Cited

U.S. PATENT DOCUMENTS

| 9,302,715 | B2 * | 4/2016 | Kim | .................... B62D 25/2036 |
| 10,112,470 | B2 * | 10/2018 | Hamilton | ............. B62D 27/065 |
| 10,787,103 | B2 * | 9/2020 | Kijima | ................... B60N 2/643 |

FOREIGN PATENT DOCUMENTS

| JP | 4692181 B2 | 6/2011 |
| JP | 2011111124 A | 6/2011 |

* cited by examiner

*Primary Examiner* — John D Walters
(74) *Attorney, Agent, or Firm* — Armstrong Teasdale LLP

(57) ABSTRACT

A vehicle body structure of a four-wheeled vehicle includes a pair of side members (8) extending in a fore and aft direction along either side of the vehicle body, a plurality of cross members (41, 42, 43) extending laterally between the side members, and a floor panel (58) attached to an upper side of the cross members. One of the cross members (42) passes through an intersection point of diagonal lines of a rectangular formation of supporting points of the four wheels, and at least one of the seat mounts (72) is positioned on the one cross member.

9 Claims, 6 Drawing Sheets

VEHICLE BODY STRUCTURE

TECHNICAL FIELD

The present invention relates to a vehicle body structure of a four wheeled vehicle.

BACKGROUND ART

A known vehicle body structure for a four wheeled vehicle includes a pair of body side members extending in the fore and aft direction along either side of the vehicle body, and a plurality of cross members extending between the body side members. See JP4692181B2, for instance. In this prior art vehicle body structure, seat mounts are provided on the junctions between one of the cross members in a rear part of the vehicle and the body side members, and on a middle part of the cross member.

Another known vehicle body structure includes a floor panel defining the floor of the vehicle body and having a kick-up portion that extends upward from a rear end part of the floor panel, and a rear floor panel extending rearward from the upper edge of the kick-up portion. See JP2011-111124A, for instance. A cross member extends laterally under the kick-up portion, and another cross member extends laterally under the rear floor panel.

The load which each wheel receives from the road surface is transmitted to the corresponding part of the vehicle body via a suspension device which is designed to absorb the shocks from the road surface and stabilize the vertical motion of the vehicle body. When the different wheels receive uneven loading from the road surface, the vehicle body undergoes angular motion (pitching and rolling motions) and a twisting deformation. Such angular movement and twisting deformation of the vehicle body cause corresponding changes in the attitude of the seats in the cabin of the vehicle, and impairs the riding comfort of the vehicle.

SUMMARY OF THE INVENTION

In view of such a problem of the prior art, a primary object of the present invention is to provide a vehicle body structure which minimizes the changes in the attitude of a seat of the vehicle in spite of an angular movement and a twisting deformation of the vehicle body.

To achieve such an object, one embodiment of the present invention provides a vehicle body structure (7) including a vehicle body (3) and four wheels (4, 5) each supported by a corresponding supporting point ($F_L$, $F_R$, $R_L$, $R_R$) on the vehicle body via a suspension device (20, 30), the supporting points being arranged in a rectangular formation (S), the vehicle body structure comprising: a pair of side members (8) extending in a fore and aft direction along either side of the vehicle body; a plurality of cross members (41, 42, 43) extending laterally between the side members; a floor panel (58) attached to an upper side of the cross members; and a seat (61) supported by the floor panel via at least one seat mount (73, 74) provided on an upper surface of the floor panel, wherein one of the cross members (42) passes through an intersection point (P) of diagonal lines (L1, L2) of the rectangular formation in plan view, and the at least one seat mount includes a seat mount (74) positioned on the one cross member.

Since the intersection point of the diagonal lines of the rectangular formation is relatively immobile when the vehicle body undergoes an angular motion and/or a twisting deformation, the seat can be kept immobile when one of the cross members passes through the intersection point of the diagonal lines of the rectangular formation of the supporting points in plan view, and the at least one seat mount includes a seat mount positioned on the cross member that passes through the intersection point, in spite of the angular motion and/or the twisting deformation of the vehicle body.

Preferably, the at least one seat mount includes a pair of front seat mounts (73) and a pair of rear seat mounts (74) arranged in a rectangular formation, the rear seat mounts being positioned on the one cross member.

Since the rear seat mounts support a large part of the weight of the occupant, the riding comfort of the occupant can be particularly improved by positioning the rear seat mounts on the cross member that is positioned on the intersection point of the diagonal lines of the rectangular formation of the supporting points.

Preferably, the front seat mounts are positioned on another one of the cross members.

Thereby, the front seat mounts are also supported in a highly stiff manner.

Preferably, the seat includes a pair of lower rails (65) extending in the fore and aft direction and attached to the floor panel via the four seat mounts, and a pair of upper rails (66) attached to a main body (67) of the seat and slidably engaged by the respective lower rails so as to be adjustable in the fore and aft direction.

Thereby, the fore and aft position of the seat can be adjusted as desired by the occupant.

Preferably, the seat includes at least a pair of seats arranged laterally next to each other, and each seat is provided with a pair of front seat mounts (73) and a pair of rear seat mounts (74) arranged in a rectangular formation, the rear seat mounts of the seats being positioned on the one cross member.

By thus arranging the two seats, the riding comfort for the both seats can be ensured.

Preferably, the vehicle body structure further comprises a battery support panel (97) extending under the floor panel in a substantially parallel relationship, and a plurality of auxiliary cross members (101, 102, 103) attached to an upper surface of the battery support panel, wherein one of the auxiliary cross members (102) is attached to a lower side of the one cross member.

Thereby, the cross member passing through the intersection point can be further reinforced by the auxiliary cross member which is attached to this cross member. Also, the gravitational center of the vehicle body can be lowered by placing battery cells under the floor panel, and supporting the battery cells with the battery panel.

Preferably, front parts of the side members support an electric motor (81) for driving the front wheels, rear parts of the side members support another electric motor (82) for driving the rear wheels, and the rear seat mounts of the seat are positioned below a line (X) passing through gravitational centers of the electric motors in side view.

Thereby, by thus positioning the seat in a relatively low position, the riding comfort of the seat can be improved.

Preferably, the seat is a front seat (61), and the vehicle body structure further comprises at least one rear seat (62) positioned behind the front seat.

Preferably, the seat is mounted on the floor panel via a laterally elongated member (122) extending at least substantially over an entire width of the seat, and the laterally elongated member overlaps the rear seat mounts in plan view.

Thereby, the laterally elongated member overlapping the rear seat mounts in plan view cooperates with the cross member passing through the intersection point so that the stiffness of this cross member can be favorably increased.

The present invention thus provides a vehicle body structure which minimizes the changes in the attitude of a seat of the vehicle in spite of an angular movement and a twisting deformation of the vehicle body.

DESCRIPTION OF THE PREFERRED EMBODIMENT(S)

A vehicle body structure according to a preferred embodiment of the present invention is described in the following with reference to the appended drawings.

Figure 1:
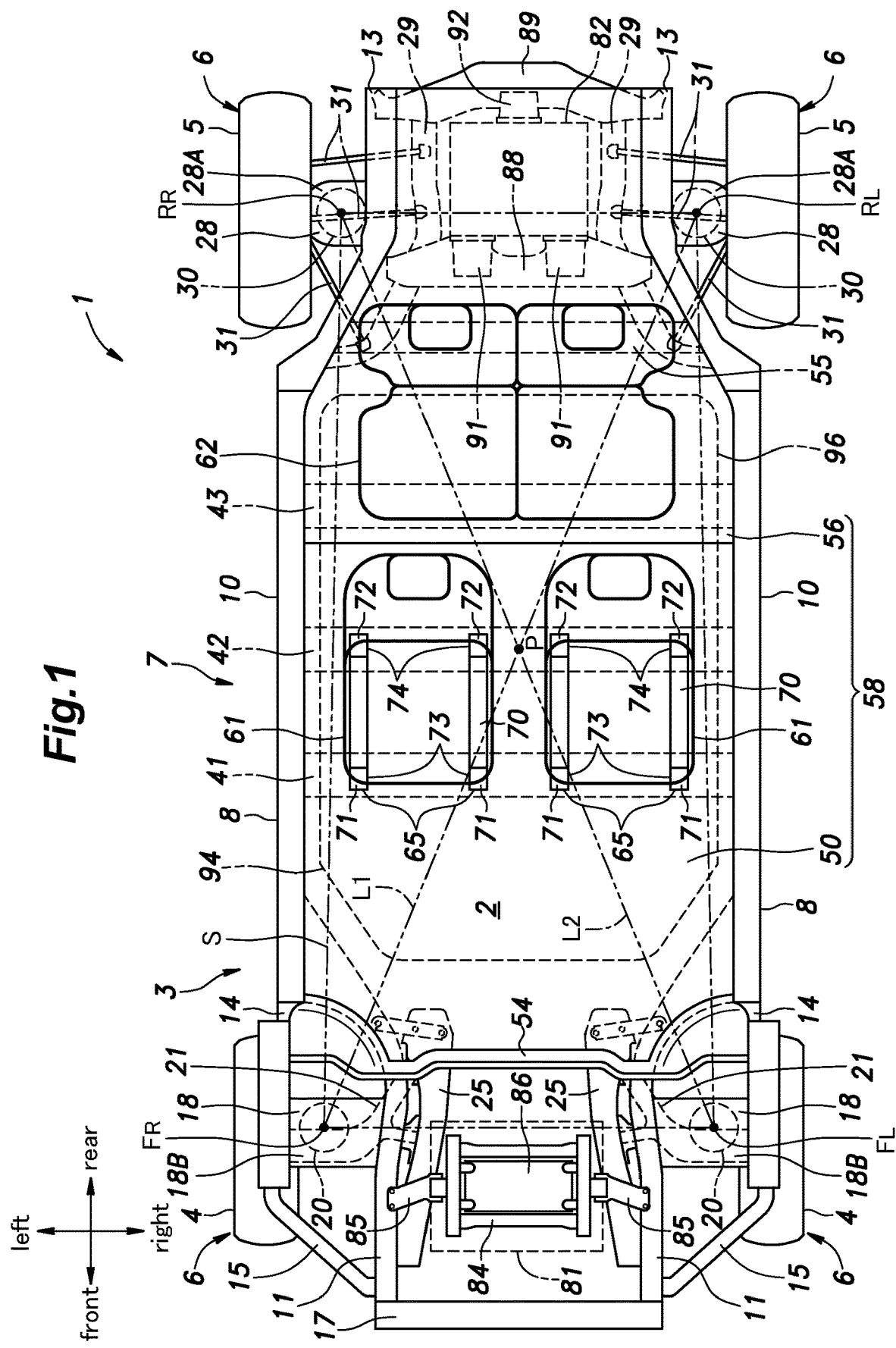
FIG. 1 is a plan view of a vehicle body structure according to an embodiment of the present invention.
Figure 2:
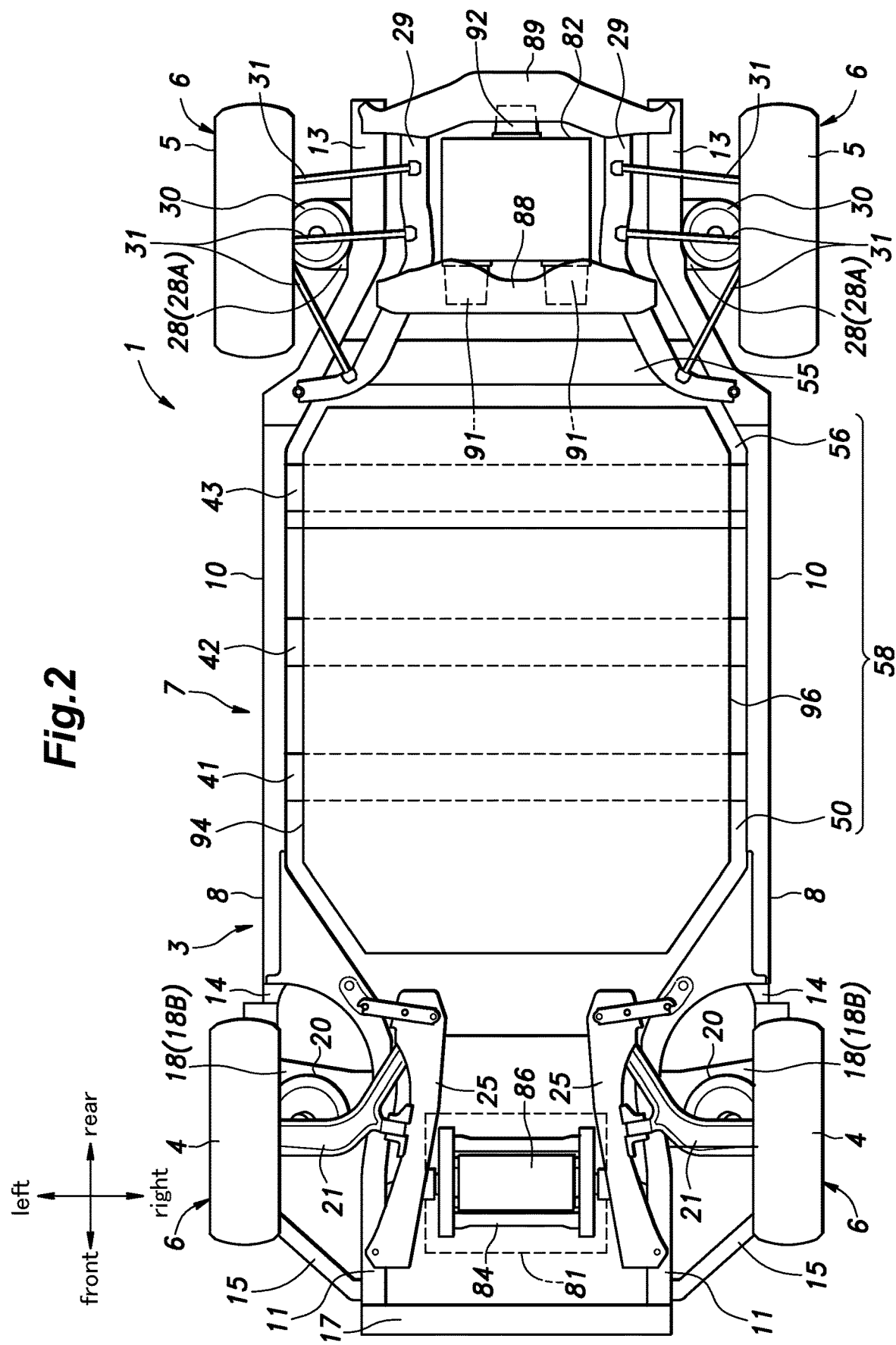
FIG. 2 is a bottom view of the vehicle body structure.

As shown in FIGS. 1 and 2, the vehicle body structure according to the present invention is applied to a four wheeled electric vehicle having four wheels. However, the vehicle to which the present invention is applied is not limited to electric vehicles, but may also be other types of vehicles such as a gasoline engine vehicles, diesel engine vehicles and hybrid vehicles. The present invention is also not limited to four wheeled vehicles, but may also be applied to other forms of vehicles such as vehicles having other numbers of wheels and tracked vehicles. The directions mentioned in the following description will be based on the view point of the driver. Since the vehicle body structure is symmetrical about a longitudinal central line, only one side of the vehicle body structure may be discussed in the following, instead of repeating the same description on the other side of the vehicle body structure, to avoid redundancy.

Figure 3:
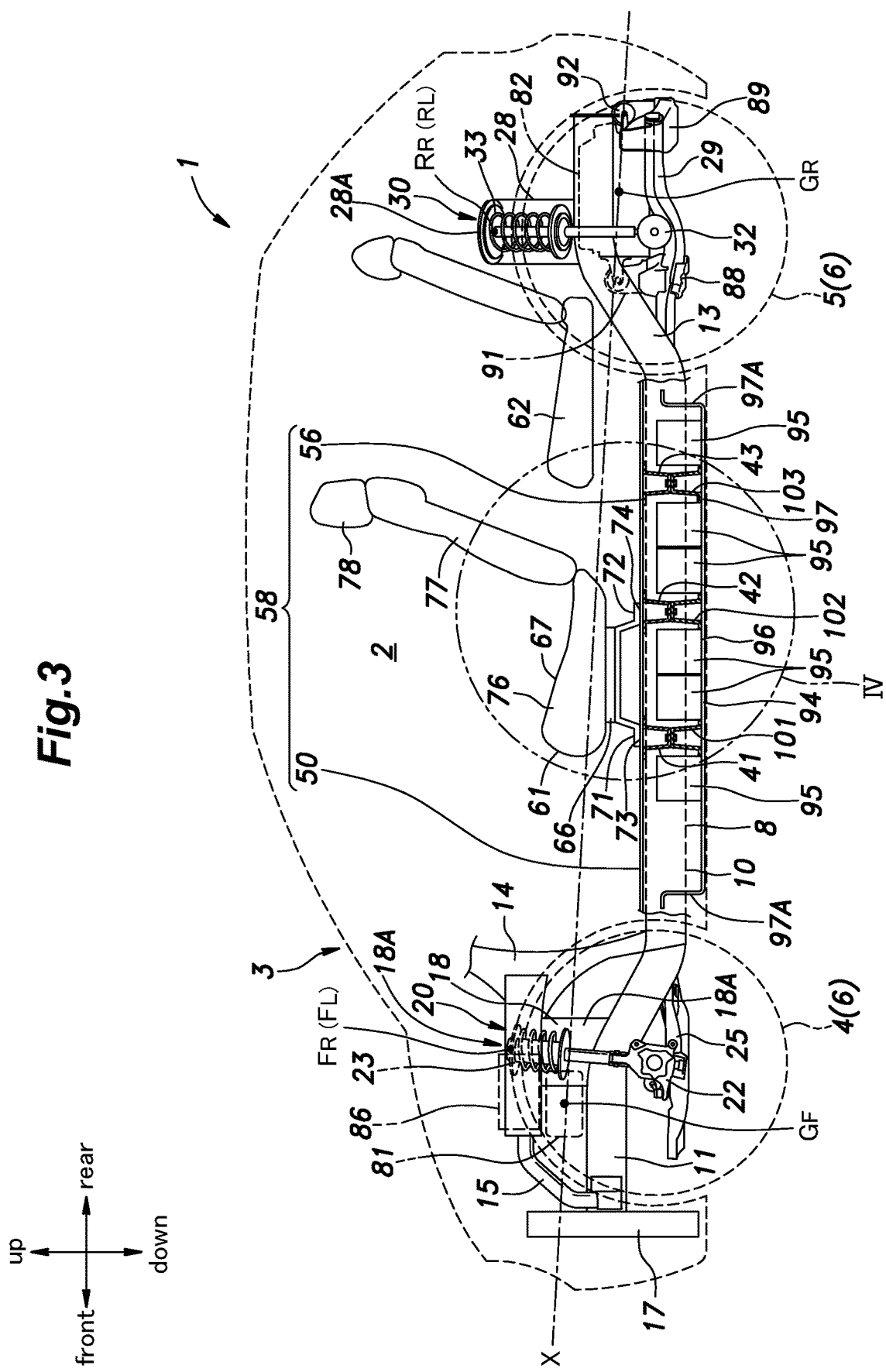
FIG. 3 is a side view of the vehicle body structure.

As shown in FIGS. 1 and 3, the vehicle 1 to which the present invention is applied includes a vehicle body 3 that defines a cabin 2, and is fitted with four wheels 6 including a pair of front wheels 4 and a pair of rear wheels 5 positioned in a rectangular formation in a conventional way. The vehicle body 3 is formed by combining a plurality of closed cross section members or channel cross section members and a plurality of panel members. Such members are typically made of sheet steel, but may also be made of other materials such as composite materials, and other metallic materials.

As shown in FIGS. 1 and 2, the vehicle body 3 is provided with a ladder frame structure including a pair of side members 8 extending in the fore and aft direction and a plurality of cross members 41 to 43 extending between the side members 8. Each side member 8 includes a side sill 10 extending in the fore and aft direction in a substantially central part of the vehicle body 3, a front side member 11 extending forward from the front end of the side sill 10, and a rear side member 13 extending rearward from the rear end of the side sill 10. The various parts of each side member 8 may consist of different members that are joined to one another by welding or the like, or may at least partly consist of differences parts of a one-piece member.

Each front side member 11 includes a rear part that extends forward and inward from the front end of the corresponding side sill 10, a middle part that extends upward and forward from the front end of the rear part, and a front part that extends forward from the middle part.

As shown in FIG. 3, a pair of front pillars 14 extend upward from the front ends of the respective side sills 10.

As shown in FIGS. 1 and 3, a front upper member 15 extends upward from a front part of the front side member 11, and is bent or curved rearward to be connected to a part of the front pillar 14 in such a manner that a large part of the front upper member 15 extends in the fore and aft direction at some distance above and outward of the front side member 11.

As shown in FIGS. 1 and 3, a front bulkhead 17 is provided at the front ends of the front parts of the front side members 11. The front bulkhead 17 is formed as a rectangular frame including a pair of vertical members vertically and a pair of horizontal cross members extending in the lateral direction between the upper ends and the lower ends of the vertical members, respectively.

A front damper housing 18 is provided between the front side member 11 and the front upper member 15. The front damper housing 18 includes a vertical wall portion 18A (see FIG. 3) facing laterally and extending upward from a rear end of the front part of the front side member 11, and an upper wall portion 18B (see FIG. 1) extending outward (in the outboard direction) from the upper end the vertical wall portion 18A. The outboard end of the upper wall portion 18B is connected to the front upper member 15.

As shown in FIG. 1, each front wheel 4 is supported by the front damper housing 18 via a front suspension device 20. As shown in FIG. 3, each front suspension device 20 includes a front suspension arm 21 which is pivotally connected to the lower side of the front side member 11, a front knuckle 22 rotatably supporting the front wheel 4 and pivotally connected to the front suspension arm 21, and a front shock absorber 23 connected between the front suspension arm 21 and the upper wall portion 18B of the front damper housing 18. The shock absorber includes a coil spring and a damper in a per se known manner. Thus, each front wheel 4 is supported by the front damper housing 18 via the front shock absorber 23. In particular, each front wheel 4 is supported by the vehicle body 3 at a supporting point $F_L$, $F_R$ provided by the junction point between the upper end of the front shock absorber 23 and the upper wall portion 18B of the front damper housing 18. Each front suspension device 20 including the front shock absorber 23 absorbs the impact and vibrations which the front wheel 4 receives from the road surface, and stabilizes the motion of the vehicle body 3. In the illustrated embodiment, the base end of the front suspension arm 21 is pivotally connected to the front side member 11 via a front sub-member 25 which extends in the fore and aft direction in an arcuate manner with the concave side thereof facing in the outboard direction. The front sub-member 25 is connected to the front side member 11 both at the front end and the rear end thereof.

As shown in FIGS. 1 and 2, each rear side member 13 extends from the rear end of the side sill 10 in a generally rearward direction, and includes a front part extending in an inward, upward and rearward direction so as to form a kick up portion, and a rear part extending rearward from the rear end of the kick up portion. The front part of the rear side member 13 thus inclines upward toward the rear end in side view, and inward toward the rear end in plan view.

A rear damper housing 28 is connected to each rear side member 13. The rear damper housing 28 generally extends upward from the rear side member 13, and includes a plate like upper wall portion 28A that extends to the outer side (in the outboard direction) of the vehicle. The upper wall portion 28A is provided at a position overlapping with the rear end part of the kick up portion of the rear side member 13 with respect to the fore and aft direction. In the present embodiment, the front edge of the upper wall portion 28A is in front of the rear end of the kick up portion of the rear side member 13, and the rear edge of the upper wall portion 28A is located behind the kick up portion of the rear side member 13 or in the rear part of the rear side member 13. The rear damper housing 28 may constitute a part of a rear side outer panel that defines the rear side wall of the vehicle body 3 or a rear inner panel that defines a rear part of the cabin 2.

A rear sub-member 29 extends from the lower side of a front part of the rear side member 13, first inward and then rearward, and the rear end of the rear sub-member 29 is connected to a rear auxiliary cross member 89 connected between the rear ends of the rear side members 13. Thus, the rear sub-member 29 extends substantially in parallel with the rear side member 13 in plan view.

As shown in FIG. 1, each rear wheel 5 is supported by the vehicle body 3 via a rear suspension device 30. As shown in FIG. 3, the rear suspension device 30 includes a rear knuckle 32 rotatably supporting the rear wheel 5, a plurality of rear suspension arms 31 each pivotally connected between the rear knuckle 32 and the rear sub-member 29, and a shock absorber 33 connected between the rear knuckle 32 and the upper wall portion of the rear damper housings 28. Thus, each rear wheel 5 is supported by the rear damper housing 28 via the rear shock absorber 33. In particular, each rear wheel 5 is supported by the vehicle body 3 at a supporting point $R_L$, $R_R$ provided by the junction point between the upper end of the rear shock absorber 33 and the upper wall portion 28A of the rear damper housing 28. Each rear suspension device 30 including the rear shock absorber 33 absorbs the impact and vibrations which the rear wheel 5 receives the road surface, and stabilizes the motion of the vehicle body 3.

As shown in FIG. 1, a first cross member 41, a second cross member 42, and a third cross member 43 extend laterally between the side sills 10 substantially at a regular interval with respect to the fore and aft direction. The lateral ends of each cross member abut against, and joined to the inboard sides of the side sills 10, respectively.

Figure 4:
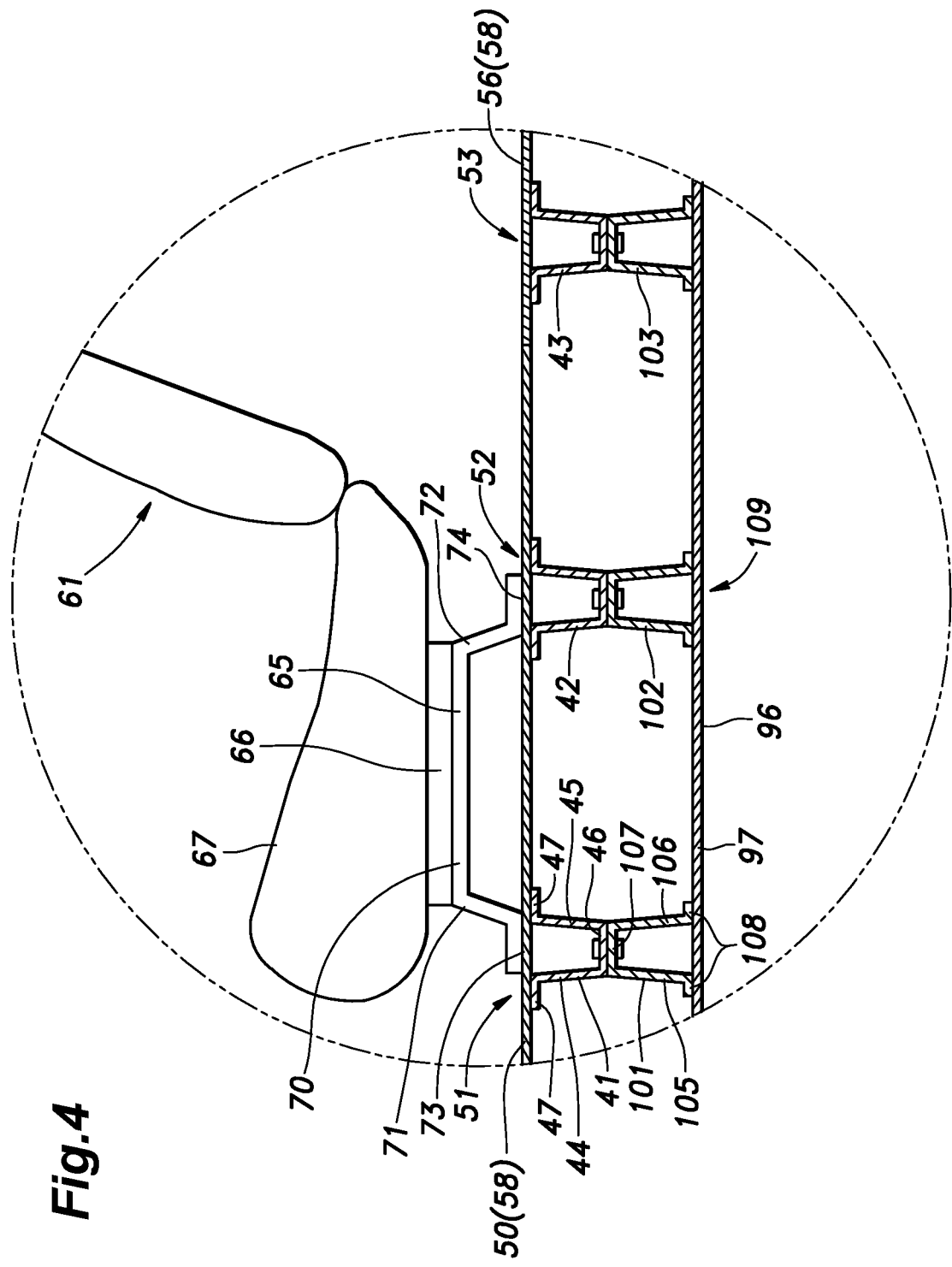
FIG. 4 is an enlarged view of a part of the vehicle body structure indicated by VI in FIG. 3.

In the present embodiment, as shown in FIG. 4, the first cross member 41, the second cross member 42, and the third cross member 43 each consist of a channel member having an open side facing upward. More specifically, each cross member includes a front wall 44, a rear wall 45, a bottom panel 46 extending between the lower edges of the front wall 44 and the rear wall 45, and a pair of flanges 47 extending away from each other from upper edges of the front wall 44 and the rear wall 45, respectively. The upper surfaces of the flanges 47 may be substantially flush with the upper surfaces of the side sills 10. In the illustrated embodiment, the front wall 44 and the rear wall 45 are slanted with respect to the vertical line so as to move away from each toward the upper ends thereof.

FIG. 1 shows a pair of diagonal lines formed by connecting the left front supporting point $F_L$ with the right rear supporting point $R_R$ and by connecting the right front supporting point $F_R$ with the left rear supporting point $R_L$, and these diagonal lines cross each other at an intersection point P. In FIG. 1, the rectangle formed by these supporting points, $F_L$, $F_R$, $R_L$ and $R_R$ is denoted by letter S. The second cross member 42 is positioned on this intersection point P. More specifically, the front edge of the second cross member 42 is positioned ahead of the intersection point P and the rear edge of the second cross member 42 is positioned behind the intersection point P. The intersection point P is located on the bottom panel 46 in plan view in the illustrated embodiment.

As shown in FIGS. 1 and 3, a front floor panel 50 having a vertically facing surface extends on and between the side sills 10. The lower surface of the front floor panel 50 is thus in contact with the upper surfaces of the left and right side sills 10, and the upper surfaces of the first cross member 41 and the second cross member 42. As shown in FIG. 4, the front floor panel 50 is attached to each cross member 41, 42 (by welding or fastening) at the flanges 47 of the cross member so that a closed cross section (a first closed cross section structure 51 and a second closed cross section structure 52) is defined by the front floor panel 50 and each of the cross members 41 and 42.

As shown in FIG. 1, a dash panel 54 facing in the fore and aft direction is connected between the left and right front pillars 14 at the respective side edges thereof. The front edge of the front floor panel 50 is connected to the lower edge of the dash panel 54.

As shown in FIG. 2, a rear cross member 55 extends laterally between the front parts of the left and right rear side members 13. A rear floor panel 56 extends between the left and right rear side members 13. The lower surface of the rear floor panel 56 is attached to the third cross member 43 and the rear cross member 55. As shown in FIG. 4, the rear floor panel 56 is attached to the flanges 47 of the third cross member 43 so as to form a third closed cross section structure 53. Similarly to the first cross member 41, the second cross member 42, and the third cross member 43, the rear cross member 55 may have a hat-shaped cross section that opens upward, and form a closed cross section structure jointly with the rear floor panel 56.

As shown in FIG. 1, the front edge of the rear floor panel 56 and the rear edge of the front floor panel 50 are connected to each other so as to jointly define a continuous floor surface. Accordingly, the front floor panel 50 and the rear floor panel 56 function as a single floor panel 58 that defines the bottom surface of the cabin 2. The floor panel 58 is thus attached to and supported by the first cross member 41, the second cross member 42, and the third cross member 43 at the lower surface thereof.

As shown in FIGS. 1 and 3, the cabin 2 contains a pair of front seats 61 and one rear seat 62 positioned behind the front seats 61 and consisting of a bench seat extending laterally to seat two occupants.

As shown in FIGS. 1 and 4, the front seats 61 are individually attached to the floor panel 58. More specifically, each front seat 61 is provided with a pair of lower rails 65 extending in the fore and aft direction in parallel to each other, and fixed to the front floor panel 50, a pair of upper rails 66 slidably engaged by the respective lower rails 65, and a seat main body 67 attached to the upper rails 66.

As shown in FIG. 4, each lower rail 65 includes a lower rail main body 70 extending in the fore and aft direction, a front leg 71 (front mounted portion) projecting downward from the lower surface of the front end of the lower rail main body 70, and a rear leg 72 (rear mounted portion) projecting downward from the lower surface of the rear end of the lower rail main body 70.

The lower end of the front leg 71 is in contact with, and connected to the upper surface of the floor panel 58, in particular to a front mounting portion 73 provided on the floor panel 58 at the position corresponding to the lower end of the front leg 71. The lower end of the rear leg 72 is also in contact with, and connected to the upper surface of the floor panel 58. A rear mounting portion 74 is provided on the upper surface of the floor panel 58 at a position corresponding to the lower end of the rear leg 72. The front leg 71 and the rear leg 72 may be attached to the floor panel 58 by using threaded bolts. Alternatively, the front mounting portion 73 and the rear mounting portion 74 may each include, for example, a through hole that is passed through the floor panel 58, a threaded bolt passed through a mounting hole provided on the lower end of the front leg 71 or the rear leg 72 and the through hole of the floor panel 58, and a nut that is threaded onto the threaded bolt to fasten the front leg 71 or the rear leg 72 to the floor panel 58.

As shown in FIG. 1, the rear mounting portions 74 for the two front seats 61 are provided on parts of the upper surface of the floor panel 58 overlapping with the second cross member 42 or on the second closed cross section structure 52 in plan view. The rear mounting portions 74 are arranged laterally in a laterally extending linear row, and are located above the bottom panel 46 of the second cross member 42.

In the present embodiment, the four front mounting portions 73 for the front seats 61 are also provided on the upper surface of the floor panel 58 so as to be arranged laterally in a laterally extending linear row. In the present embodiment, the four front mounting portions 73 are positioned above the bottom panel 46 of the first cross member 41 in an overlapping relationship in plan view. Therefore, the four front mounting portions 73 are positioned directly on the upper surface of the first closed cross section structure 51.

As shown in FIG. 3, the seat main body 67 of each front seat 61 is provided with a seat cushion 76 that supports the bottom of the seated occupant, a seat back 77 or a back rest that extends upright from a rear end part of the seat cushion 76 to support the back of the occupant, and a headrest 78 projecting from the upper end of the seat back 77. As shown in FIG. 4, the upper surface of the seat cushion 76 may be inclined downward toward the rear. Further, each upper rail 66 is slidably engaged by the corresponding lower rail 65, and the seat cushion 76 is attached to the upper rails 66 so that the position of the seat main body 67 can be slidably adjusted with respect to the floor panel 58 in the fore and aft direction Since the seat main body 67 can be adjusted in the fore and aft direction with respect to the floor panel 58, the occupant can move the seat main body 67 back and forth as desired. Thus, the driver can adjust the position of the seat main body 67 by moving the position of the seat main body 67 in accordance with the build of the driver so that the driver can operate the vehicle with comfort.

As shown in FIG. 3, the vehicle body 3 is provided with a power train for driving the vehicle 1. The power train includes a front wheel electric motor 81 for driving the front wheels 4 and a rear wheel electric motor 82 for driving the rear wheels 5.

As shown in FIG. 1, a front upper sub-frame 84 is provided between the left and right front side members 11 in plan view. The front upper sub-frame 84 has a rectangular frame shape facing upward or extending substantially horizontally. The front upper sub-frame 84 is connected between the left and right front side members 11 via a pair of connecting members 85 extending outward and downward from the respective lateral ends of the front upper sub-frame 84. An electric unit 86 for charging and feeding electric power is received inside the front upper sub-frame 84, and is fixedly secured thereto. The electric unit 86 is, for example, an AC-DC converter. As shown in FIG. 3, the front wheel electric motor 81 is supported by the front upper sub-frame 84 under the electric unit 86. The front wheel electric motor 81 is positioned in a laterally central part of the vehicle body 3, and has an output shaft extending laterally. The drive torque of the front wheel electric motor 81 is transmitted to the front wheels 4 via a transmission mechanism not shown in the drawings. The front wheel electric motor 81 may be arranged such that the center of gravity GF is located below the upper end of the front upper members 15.

As shown in FIG. 1, a front auxiliary cross member 88 and a rear auxiliary cross member 89 are connected between the left and right rear sub-members 29. The front auxiliary cross member 88 extends laterally, and is connected to middle parts of the rear sub-members 29 at the lateral end parts thereof, respectively. The rear auxiliary cross member 89 also extends laterally, and connected to rear parts of the rear sub-members 29 at the lateral end parts thereof, respectively. In the present embodiment, the rear auxiliary cross member 89 is additionally connected to the rear parts of the rear side members 13 at the lateral end parts thereof. The rear wheel electric motor 82 is supported on the upper surface of the front auxiliary cross member 88 via a pair of motor mounts 91 and on the upper surface of the rear auxiliary cross member 89 via a motor mount 92.

The rear wheel electric motor 82 is arranged in a laterally central part of the vehicle body 3 in such a manner that the output shaft thereof extends in the lateral direction. The drive torque of the rear wheel electric motor 82 is transmitted to the rear wheels 5 via a transmission mechanism not shown in the drawings. As shown in FIG. 3, the rear wheel electric motor 82 is disposed such that its center of gravity GR is positioned below the rear side members 13 in a side view. Preferably, the center of gravity GR is positioned below the lower side of each rear side member 13, or below a vertically middle point of each rear side member 13. Furthermore, the rear wheel electric motor 82 may be arranged such that its center of gravity GR is located behind the rotational axis of the rear wheels 5.

The rear mounting portions 74 of the front seats 61 are located below a line X that passes through the center of gravity GF of the front wheel electric motor 81 and the center of gravity GR of the rear wheel electric motor 82 in side view so that the position of the front seat 61 can be lowered as compared to the case where the rear mounting portions 74 are located above the line X. Thereby, the gravitational center of the vehicle body 3 can be lowered so that the riding comfort of the vehicle 1 can be improved.

As shown in FIG. 3, an IPU 94 (Intelligent Power Unit) for supplying controlled electric power to the front wheel electric motor 81 and the rear wheel electric motor 82 is provided under the floor panel 58. The IPU 94 includes a plurality of battery cells 95 connected to each other, a battery case 96 that houses the battery cells 95, and electric circuit units such as a battery control unit, a DC-DC converter and an inverter also housed in the battery case 96.

The battery case 96 is mostly formed by a battery support panel 97 (a bottom panel) extending under the floor panel 58 in a spaced apart relationship. The battery support panel 97 may be provided with an upwardly extending side wall 97A along the outer periphery thereof so as to form a pan-like container. The battery cells 95 are placed on the upper surface of the battery support panel 97. The peripheral edge of the battery support panel 97 substantially coincides with the inner edges of the side sills 10, a line connecting the rear ends of the middle parts of the front side members 11, and the front edge of the rear cross member 55 in plan view.

As shown in FIG. 4 in which the battery cells 95 are omitted from illustration, the battery case 96 is provided with first to third auxiliary cross members 101 to 103 (IPU cross members). The first to third auxiliary cross members 101 to 103 extend in the lateral direction, and are attached to the upper surface of the battery support panel 97. The first to third auxiliary cross members 101 to 103 are arranged in the fore and aft direction at a regular interval so as to coincide with the first to third cross members 41, 42 and 43. Each auxiliary cross member 101, 102, 103 has a hat-shaped cross section having an open side facing downward. More specifically, each of auxiliary cross member 101, 102, 103 includes a front wall 105 inclining rearward, a rear wall 106 inclining forward, and an upper wall 107 connected between the upper edges of the front wall 105 and the rear wall 106 and extends in a substantially horizontal direction. The lower edges of the front wall 105 and the rear wall 106 are provided with flanges 108 extending away from each other. The first to third auxiliary cross members 101 to 103 are attached to the upper surface of the battery support panel 97 at the flanges 108.

The first to third auxiliary cross members 101 to 103 coincide with the first to third cross members 41 to 43 in plan view, respectively. The upper wall 107 of the first auxiliary cross member 101 is attached to the bottom panel 46 of the first cross member 41 from below. Similarly, the upper wall 107 of the second auxiliary cross member 102 is attached to the bottom panel 46 of the second cross member 42 from below, and the upper wall 107 of the third auxiliary cross member 103 is attached to the bottom panel 46 of the third cross member 43 from below. As a result, the IPU 94 is supported by the left and right side members 8 via the first cross member 41, the second cross member 42, the third cross member 43, and the battery support panel 97.

By placing the IPU 94 including the battery cells 95 under the floor panel 58, the center of gravity of the vehicle body 3 can be lowered as compared with the case where the battery cells 95 are placed on or above the floor panel 58. Thereby, riding comfort can be improved.

Figure 5:
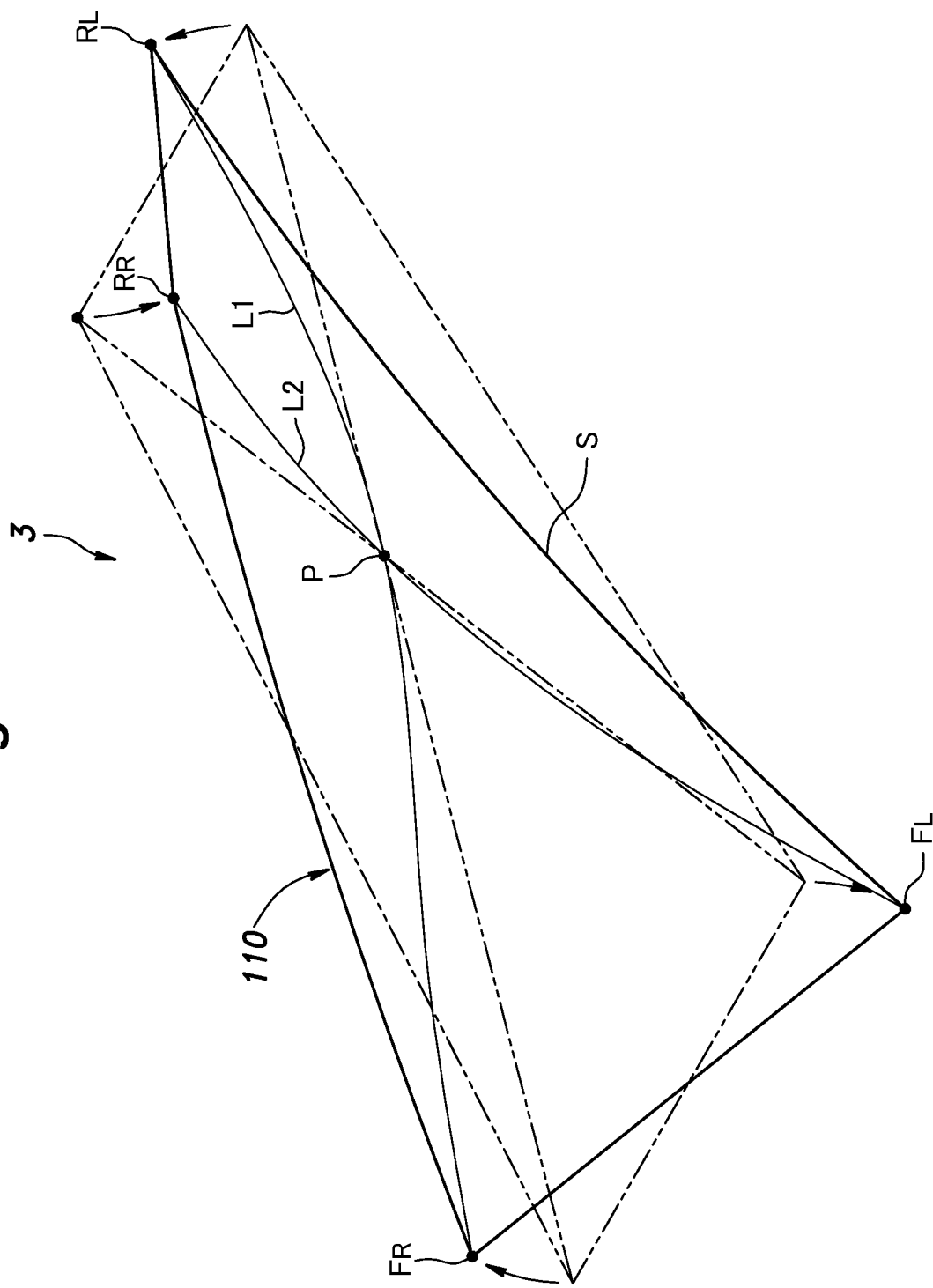
FIG. 5 is a diagram illustrating a twisting deformation of the vehicle body.

The mode of operation of the above-described embodiment will be described in the following. The vehicle 1 is provided with a vehicle body structure 7 including the vehicle body 3 internally defining the cabin 2 in which the front seats 61 and the rear seat 62 are provided. The vehicle 1 is further provided with the four wheels 6 including the front wheels 4 and the rear wheels 5, and the suspension devices 20 and 30. When different loads are applied to the suspension devices 20 and 30 from the road surface, the vehicle body 3 is twisted by the force transmitted via the suspension devices 20 and 30. For example, when a force directed upward is applied to the vehicle body 3 by the right front suspension device 20 and a force directed upward applied to the vehicle body 3 by the left rear suspension device 30, the vehicle body 3 is twisted in such a manner that the supporting point $F_L$ of the left front suspension device 20 and the supporting point $R_R$ of the right rear suspension device 30 move downward, and the supporting point $F_R$ of the right front suspension device 20 and the supporting point $R_L$ of the left rear suspension device 30 move upward. In FIG. 5, the vehicle body 3 is represented by a rectangular frame 110 corresponding to the rectangle S having corners at the supporting points $F_L$, $F_R$, $R_L$, and $R_R$. The rectangular frame 110 thus undergoes a twisting deformation, but the intersection point P between the diagonal lines L1 and L2 of the rectangle S remains stationary. When the vehicle body 3 undergoes an angular movement such as rolling movement and pitching movement, again, the intersection point P remains stationary.

Thus, the position of the intersection point P is unlikely to change due to the angular movement or twisting deformation of the vehicle body 3. Therefore, even when the vehicle body 3 is twisted or rotated due to uneven inputs from the different suspension devices 20 and 30, the position and the attitude of the second cross member 42 extending through the intersection point P of the diagonal lines L1 and L2 of the rectangle S remain relatively unaffected, and remain substantially unchanged. Thus, by positioning the second cross member 42 so as to pass through the intersection point P of the diagonal lines L1 and L2 in plan view, the deformation and the displacement of the second cross member 42 can be minimized, and the transmission of vibrations and other motions from the suspension devices 20 and 30 to the second cross member 42 can be minimized.

The rear mounting portions 74 are provided on the second cross member 42 or coincide with the second cross member 42 in plan view so that the position and the attitude of the second cross member 42 remain relatively unaffected by the twisting deformation and the angular movement of the vehicle body 3. Therefore, by providing the rear mounting portions 74 on the second cross member 42, the rear parts of the front seats 61 can be supported, via the floor panel 58, by the second cross member 42 which remains relatively unaffected by the angular movement or twisting deformation of the vehicle body 3. As a result, the attitude of the front seats 61 remains relatively fixed in position in spite of the angular movement and the twisting deformation of the vehicle body 3 as compared with the case where the rear mounting portions 74 are provided on other parts of the floor panel 58.

Further, as shown in FIG. 4, the second cross member 42 cooperates with the floor panel 58 (the front floor panel 50) to form the second closed cross section structure 52. By providing the second closed cross section structure 52 in this way, the stiffness of the second cross member 42 is further increased. By increasing the stiffness of the second cross member 42, the deformation of the second cross member 42 is minimized so that the attitude of the front seats 61 can be kept stable, and the vibrations of the vehicle body 3 are prevented from being transmitted to the occupants.

In the present embodiment, as best illustrated in FIG. 4, since the front mounting portions 73 for the front seats 61 are provided on the first cross member 41, the front parts of the front seats 61 are connected to the first cross member 41 via the floor panel 58. Since the first cross member 41 and the floor panel 58 (more specifically, the front floor panel 50) jointly form the first closed cross section structure 51, the stiffness of the first cross member 41 is further increased. As a result, the attitude of the front seats 61 whose front parts are supported by the first cross member 41 can be kept relatively fixed in position without regard to the angular motion and the twisting deformation of the vehicle body 3, and vibrations of the vehicle body 3 are prevented from being transmitted to the occupants.

As shown in FIG. 4, the first closed cross section structure 51 and the second closed cross section structure 52 are connected to each other by the lower rails 65. This further reinforces the first cross member 41 and the second cross member 42. Thereby, the front seats 61 can be kept relatively fixed in position without regard to the angular motion and the twisting deformation of the vehicle body 3, and vibrations of the vehicle body 3 are prevented from being transmitted to the occupants, to an increased degree.

The second auxiliary cross member 102 is attached to the lower side of the second cross member 42. Thereby, the second cross member 42 is further reinforced so that the second cross member 42 is less likely to be deformed, and is less affected by the angular movement or twisting deformation of the vehicle body 3. Therefore, the attitude of the front seats 61 is less likely to be affected by the angular movement or twisting deformation the vehicle body 3. Further, as shown in FIG. 4, since the second cross member 42 and the second auxiliary cross member 102 are joined together, a double closed cross section structure 109 is provided on the lower side of the rear mounting portions 74 so that the stiffness of the vehicle body 3 is particularly increased. Similarly, since the first cross member 41 is reinforced by the first auxiliary cross member 101, the attitude of the front seats 61 is less likely to be affected by the angular movement or twisting deformation the vehicle body 3.

Since the torso of the occupant of each front seat 61 is located in a rear part of the seat main body 67 (seat cushion), the rear legs 72 support a larger load than the front legs 71. Therefore, the displacement and vibrations of the rear legs 72 are more important than those of the front legs 71 in determining the riding comfort of the occupant. By positioning the rear legs 72 on the second cross member 42 which is located on the intersection point of the diagonal lines L1 and L2, the front seats 61 can be most favorably protected from the angular movement and twisting deformation of the vehicle body 3. This improves the riding comfort of the occupants, and helps the driver to better concentrate on driving.

The present invention has been described in terms of a specific embodiment, but is not limited by such an embodiment, and can be modified in various ways without departing from the scope of the present invention. For instance, in the above embodiment, the first to third auxiliary cross members 101 to 103 were all provided at positions corresponding to the first cross member 41, the second cross member 42, and the third cross member 43, respectively. However, there may be additional auxiliary cross members for the purpose of reinforcing the bottom panel 46 or other purposes without being attached to any of the first to third cross members 41, 42, 43.

In the above embodiment, the lower rails 65 were attached to the floor panel 58 at the front legs 71 and the rear legs 72, but may be attached to the floor panel 58 in different ways. For instance, each lower rail 65 may be attached to a part of the floor panel 58 positioned directly above the second cross member 42 via a single mounting portion which is preferably positioned in a central point of the lower rail 65 with respect to the fore and aft direction.

Figure 6:
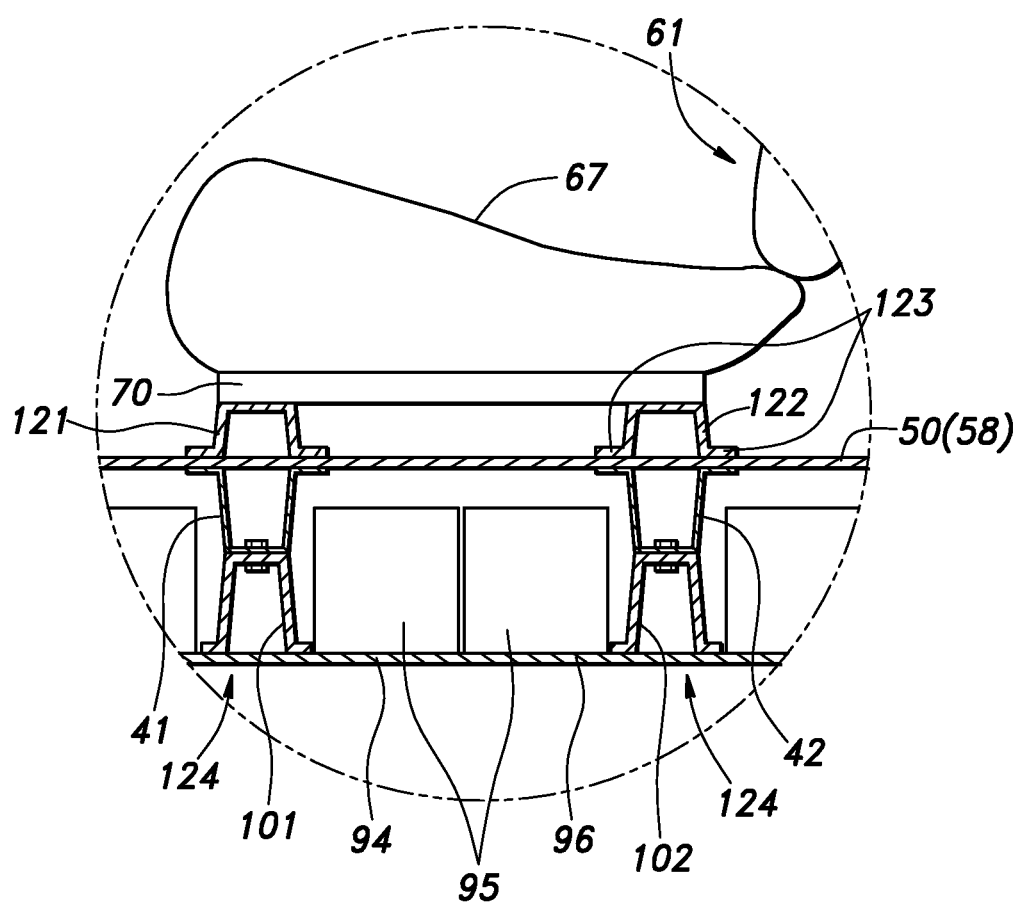
FIG. 6 is a modified embodiment of seat mounts used in the vehicle body structure.

In the above described embodiment, the front legs 71 and the rear legs 72 were each configured as a single strip of material (sheet metal or the like) or an extension of the lower rail 65 that extends downward from the lower surface of the corresponding lower rail 65, but the present invention is not limited by this embodiment. For instance, as shown in FIG. 6, each lower rail 65 may be provided with a front leg 121 and a rear leg 122 each having a hat-shaped cross section with an open side facing downward in side view. In other words, each leg may include a top wall, a front wall extending downward from the front edge of the top wall, a rear wall extending downward from the rear edge of the top wall, and a pair of flanges 123 extending from the lower edges of the front wall and the rear wall away from each other. The flanges 123 may be attached to the floor panel 58 so as to align with the flanges of the corresponding cross member 41, 42. Each leg 121, 122 may have a lateral width corresponding to the lateral width of the lower rail 65 as in the foregoing embodiments.

In another embodiment, each front seat 65 may have a single front leg 121 and/or a single rear leg 122 each extending laterally across the two lower rails 65 of the front seat 61 or substantially over an entire width of the front seat 61. In this case, the front leg 121 overlaps the front mounting portions 73, and the rear leg 122 overlaps the rear mounting portions 74 in plan view. In such a configuration, the legs 121 and 122 can serve as reinforcing members. It is also possible for the two front seats 61 to have a common leg (the single leg for the front seats 61) or a pair of common legs (the front leg and the rear leg) that extend substantially over the entire width of the cabin 2. By providing a pair of common legs that extend substantially over the entire width of the cabin 2 to serve as the front legs and the rear legs of the front seats 61, a triple closed cross section structure is formed in association with each of the first cross member 41 and the second cross member 42.

Also, in the above embodiment, the seat 61 was supported by the floor panel 58 via four seat mounts (a pair of front mounting portions 73 and a pair of rear mounting portions 74), but in another embodiment the seat 61 may consist of a one-legged seat supported by a single pole; namely, the seat 61 may be supported by the floor panel 58 via only a single seat mount positioned on the cross member that passes through the intersection point of the diagonal lines of the rectangular formation of the supporting points in plan view.

The invention claimed is:

1. A vehicle body structure including a vehicle body and four wheels each supported by a corresponding supporting point on the vehicle body via a suspension device, the supporting points being positioned in a rectangular formation, the vehicle body structure comprising:
   a pair of side members extending in a fore and aft direction along either side of the vehicle body;
   a plurality of cross members extending laterally between the side members;
   a floor panel attached to an upper side of the cross members; and
   a seat supported by the floor panel via at least one seat mount provided on an upper surface of the floor panel,
   wherein one of the cross members passes through an intersection point of diagonal lines of the rectangular formation in plan view, and the at least one seat mount includes a seat mount positioned on the one cross member.

2. The vehicle body structure according to claim 1, wherein the at least one seat mount includes a pair of front seat mounts and a pair of rear seat mounts arranged in a rectangular formation, the rear seat mounts being positioned on the one cross member.

3. The vehicle body structure according to claim 2, wherein the front seat mounts are positioned on another one of the cross members.

4. The vehicle body structure according to claim 2, wherein the seat includes a pair of lower rails extending in the fore and aft direction and attached to the floor panel via the four seat mounts, and a pair of upper rails attached to a main body of the seat and slidably engaged by the respective lower rails so as to be adjustable in the fore and aft direction.

5. The vehicle body structure according to claim 2, wherein front parts of the side members support an electric motor for driving front wheels, rear parts of the side members support another electric motor for driving rear wheels, and the rear seat mounts of the seat are positioned below a line passing through gravitational centers of the electric motors in side view.

6. The vehicle body structure according to claim 2, wherein the seat is mounted on the floor panel via a laterally elongated member extending at least substantially over an entire width of the seat, and the laterally elongated member overlaps the rear seat mounts in plan view.

7. The vehicle body structure according to claim 1, wherein the seat includes at least a pair of seats arranged laterally next to each other, and each seat is provided with a pair of front seat mounts and a pair of rear seat mounts arranged in a rectangular formation, the rear seat mounts of the seats being positioned on the one cross member.

8. The vehicle body structure according to claim 1, further comprising a battery support panel extending under the floor panel in a substantially parallel relationship, and a plurality of auxiliary cross members attached to an upper surface of the battery support panel,
   wherein one of the auxiliary cross members is attached to a lower side of the one cross member.

9. The vehicle body structure according to claim 1, wherein the seat is a front seat, and the vehicle body structure further comprises at least one rear seat positioned behind the front seat.

* * * * *